No. 710,971. Patented Oct. 14, 1902.
C. W. HARRIS.
RUBBER TIRE.
(Application filed Apr. 11, 1902.)
(No Model.)

WITNESSES:
T. Llewellyn Walker
Clifton P. Grant

INVENTOR.
Chas. W. Harris
BY
ATTORNEYS

THE NORRIS PETERS CO., PHOTO-LITHO., WASHINGTON, D. C.

UNITED STATES PATENT OFFICE.

CHARLES W. HARRIS, OF AKRON, OHIO.

RUBBER TIRE.

SPECIFICATION forming part of Letters Patent No. 710,971, dated October 14, 1902.

Application filed April 11, 1902. Serial No. 102,412. (No model.)

*To all whom it may concern:*

Be it known that I, CHARLES W. HARRIS, a citizen of the United States, residing at Akron, in the county of Summit and State of Ohio, have invented certain new and useful Improvements in Rubber Tires, of which the following is a specification.

My invention relates to improvements in solid-rubber tires for vehicle-wheels, and more especially to tires held in the rim or channel of the wheel by one or more independent retaining wires or bands.

In service it has been found that the retaining wires or bands have a tendency to wear or cut through the base of the tire; and the object of my invention is to provide means to overcome this difficulty, and thereby lengthen the life of the tire to the natural wear upon its tread. I am aware that wires or cross-rods to support the retaining-bands have been employed; but such devices subject the tire to a like wear by rust and abrasion as the retaining-bands and for this reason, as well as the expense and trouble of application, are objectionable. These objections I avoid by the employment of frictional fabric strips that are flexible, more in the nature of and adapted to operate with the tire, and at the same time interpose a substantial wearing-surface between the retaining-wires and the channel, thereby protecting the base of the tire, and these fabric strips, forming seats for the wires and contacting or resting in the channel, form a frictional bearing that materially assists in preventing the creeping of the tire.

My invention consists of the constructions and combinations hereinafter described, and set forth in the accompanying drawings, in which—

Figure 1:
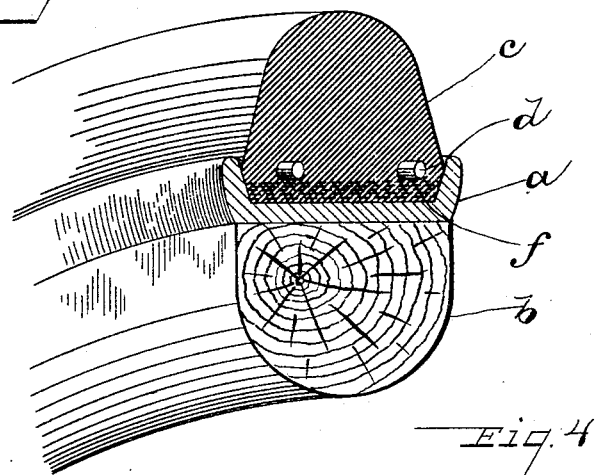
Figure 2:
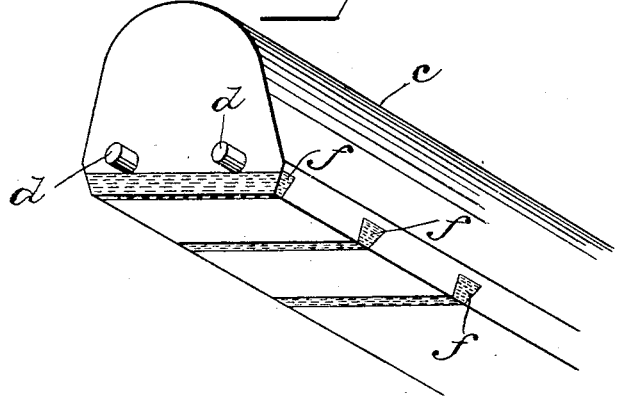
Figure 3:
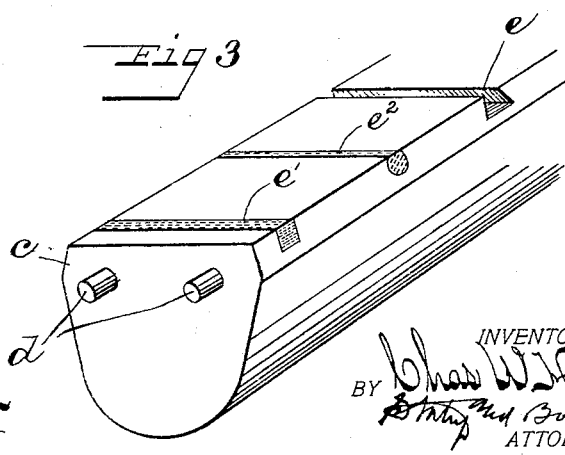

Figure 1 is a sectional elevation of a wheel rim and tire, partly in perspective, embodying my device. Fig. 2 shows a tire with my frictional fabric strips therein; Fig. 3, a tire with several forms of openings for the strips, and Fig. 4 the preferred form of the strips.

Like parts are represented by similar letters of reference in the several views.

Figure 4:
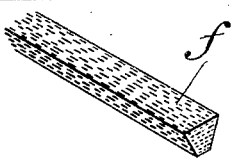

In constructing my device I employ a metallic channel $a$, attached to the wooden felly $b$ of the wheel. Within the channel $a$ I place the rubber tire $c$, and the same is held in place by one or more retaining bands or wires $d$, two wires being preferably used, as shown in the drawings. Between the retaining-wires and the base of the tire at intervals on said base and preferably extending through said base I provide transverse slots or openings, which may be of any desired form, but preferably V-shaped or beveled, as shown at $e$. In Fig. 4 I have shown two other forms of these openings—the square opening $e'$ and the round opening $e^2$; but as above stated, I prefer the V-shaped opening $e$, as it will at all times better hold the strip within the opening and the tire within the channel. Within these openings I place the frictional fabric strips $f$, said strips being preferably formed to come flush with the bottom and sides of the base of the tire, so as to contact with the channel and form seats resting in said channel for the retaining bands or wires. These frictional fabric strips may be composed of any fibrous or pliable material, glued or otherwise held together in the form desired; but I preferably make them of alternate layers of canvas and india-rubber formed into a mass of the required shape. The transverse slots or openings for the strips may be molded in the tire and the strips placed therein after the tire is vulcanized; but the strips are preferably vulcanized in the tire. The tire, with the retaining bands and strips in place therein, is then applied to the wheel in the usual manner. The strips forming rests for the retaining-wires and being flush with the bottom and sides of the base of the tire are seated in the channel, thereby taking the wear of the wires and protecting the tire, and, further, by reason of their frictional resistance in the channel prevent the creeping of the tire.

Having thus described my invention, I claim—

1. In a rubber tire for vehicle-wheels, the combination with the channel, the tire and independent retaining-wires, of frictional fabric strips extending transversely at intervals through said tire to form rests for said retaining-wires, substantially as specified.

2. In a rubber tire for vehicle-wheels, the combination with the channel, tire and independent retaining-wires, of frictional fabric strips extending transversely at intervals through said tire to form rests for said retaining-wires, said strips being seated in said channel, substantially as specified.

3. In a rubber tire for vehicle-wheels, the combination with the channel, the tire and independent retaining-wires, of frictional fabric strips as described extending transversely at intervals through said tire to form rests for said retaining-wires, the bottoms and ends of said strips adapted to stand flush with the bottom and sides of the base of said tire, substantially as specified.

4. In a rubber tire for vehicle-wheels, the combination with the channel, the tire and independent retaining-wires, said tire having at intervals transverse openings extending from the base of said tire to the bottom of the wires, of frictional fabric strips adapted to fit in said transverse openings forming rests for said retaining-wires, seated against the bottom and inner sides of said channel, substantially as specified.

5. In a rubber tire for vehicle-wheels, the combination with the channel, the tire and independent retaining-wires, said tire having at intervals transverse openings extending from the base of the tire to the bottom of the retaining-wires, of frictional fabric strips to fit said transverse openings formed independent of but vulcanized in said tire, the bottoms and ends of said strips adapted to stand flush with the bottom and sides of the base of said tire, substantially as specified.

6. In a rubber tire for vehicle-wheels, the combination with the channel, the tire and independent retaining-wires, of frictional fabric strips in said tire at an angle to the longitudinal line of said retaining-wires to form rests for said wires, said strips being seated in the channel, substantially as specified.

In testimony whereof I have hereunto set my hand this 5th day of April, A. D. 1902.

CHARLES W. HARRIS.

Witnesses:
 PERCY NORTON,
 CHAS. I. WELCH.